US007338360B2

(12) United States Patent
Jarvis et al.

(10) Patent No.: US 7,338,360 B2
(45) Date of Patent: Mar. 4, 2008

(54) FINANCIAL TRADING GAME

(75) Inventors: Eugene Jarvis, Park Ridge, IL (US); Andrew Eloff, Evanston, IL (US)

(73) Assignee: IGT, Reno, NV (US)

( * ) Notice: Subject to any disclaimer, the term of this patent is extended or adjusted under 35 U.S.C. 154(b) by 97 days.

(21) Appl. No.: 11/381,947

(22) Filed: May 5, 2006

(65) Prior Publication Data

US 2006/0205499 A1 Sep. 14, 2006

Related U.S. Application Data

(63) Continuation of application No. 10/002,553, filed on Nov. 23, 2001, now Pat. No. 7,040,982.

(51) Int. Cl.
*A63F 13/00* (2006.01)
*A63F 9/24* (2006.01)
*G06F 17/00* (2006.01)
*G06F 19/00* (2006.01)

(52) U.S. Cl. .............................. 463/9; 463/16; 463/25; 463/37; 700/91

(58) Field of Classification Search .................... 463/1, 463/9, 10, 16–23, 25–31, 37, 40–47; 273/138.1, 273/139, 138.2, 148 R, 148 B, 459–461; 700/90–93
See application file for complete search history.

(56) References Cited

U.S. PATENT DOCUMENTS 3,559,993 A 2/1971 Thomas
3,770,277 A 11/1973 Cass
4,363,489 A 12/1982 Chodak et al.
4,448,419 A 5/1984 Telnaes
4,582,324 A 4/1986 Koza et al.

(Continued)

FOREIGN PATENT DOCUMENTS

EP 0 874 337 A1 10/1998

(Continued)

OTHER PUBLICATIONS

A Vamp for All Seasons Article, written by Strictly Slots, published in 2002.

(Continued)

*Primary Examiner*—Robert E. Pezzuto
*Assistant Examiner*—Binh-An D. Nguyen
(74) *Attorney, Agent, or Firm*—Bell, Boyd & Lloyd LLP

(57) ABSTRACT

A game, and more particularly to an electronic game that simulates trading securities on an exchange. The game is preferably played as a video gaming machine for gambling purposes. A computing device is provided having, among other things, a video screen display on which a line chart is displayed. The computing device also includes a selection device, which provides a means by which the player interacts with the computing device to "buy" or "sell". The line chart includes a vertical axis that corresponds to the value or price of one or more securities, and a horizontal axis that corresponds to time. A segmented line is plotted on the line chart during a round of play. A random number generator randomly determines the vertical axis value for each point plotted along the segmented line.

26 Claims, 9 Drawing Sheets

U.S. PATENT DOCUMENTS

| | | | |
|---|---|---|---|
| 4,624,459 | A | 11/1986 | Kaufman |
| 4,666,160 | A | 5/1987 | Hamilton |
| 4,695,053 | A | 9/1987 | Vazquez, Jr. et al. |
| 4,840,382 | A | 6/1989 | Rubin |
| 4,932,668 | A | 6/1990 | Stewart |
| 4,991,848 | A | 2/1991 | Greenwood et al. |
| 5,080,368 | A | 1/1992 | Weisser |
| 5,083,800 | A | 1/1992 | Lockton |
| 5,127,651 | A | 7/1992 | Okada |
| 5,178,390 | A | 1/1993 | Okada |
| 5,205,555 | A | 4/1993 | Hamano |
| 5,342,047 | A | 8/1994 | Heidel et al. |
| 5,456,465 | A | 10/1995 | Durham |
| 5,511,781 | A | 4/1996 | Wood et al. |
| 5,524,888 | A | 6/1996 | Heidel |
| 5,536,016 | A | 7/1996 | Thompson |
| 5,542,669 | A | 8/1996 | Charron et al. |
| 5,560,603 | A | 10/1996 | Seelig et al. |
| 5,611,535 | A | 3/1997 | Tiberio |
| 5,702,303 | A | 12/1997 | Takemoto et al. |
| 5,711,525 | A | 1/1998 | Breeding |
| 5,769,716 | A | 6/1998 | Saffari et al. |
| 5,772,509 | A | 6/1998 | Weiss |
| 5,774,878 | A | 6/1998 | Marshall |
| 5,775,692 | A | 7/1998 | Watts et al. |
| 5,788,573 | A | 8/1998 | Baerlocher et al. |
| 5,823,874 | A | 10/1998 | Adams |
| 5,833,538 | A | 11/1998 | Weiss |
| 5,842,921 | A | 12/1998 | Mindes et al. |
| 5,848,932 | A | 12/1998 | Adams |
| 5,851,148 | A | 12/1998 | Brune et al. |
| 5,873,781 | A | 2/1999 | Keane |
| 5,882,261 | A | 3/1999 | Adams |
| 5,890,963 | A | 4/1999 | Yen |
| 5,902,184 | A | 5/1999 | Bennett et al. |
| 5,911,418 | A | 6/1999 | Adams |
| 5,930,762 | A | 7/1999 | Masch |
| 5,947,820 | A | 9/1999 | Morro et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,980,384 | A | 11/1999 | Barrie |
| 5,984,781 | A | 11/1999 | Sunaga |
| 5,997,400 | A | 12/1999 | Seelig et al. |
| 5,997,401 | A | 12/1999 | Crawford |
| 6,004,207 | A | 12/1999 | Wilson, Jr. et al. |
| 6,015,346 | A | 1/2000 | Bennett |
| 6,019,369 | A | 2/2000 | Nakagawa et al. |
| 6,024,641 | A | 2/2000 | Sarno |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,102,798 | A | 8/2000 | Bennett |
| 6,120,031 | A | 9/2000 | Adams |
| 6,126,541 | A | 10/2000 | Fuchs |
| 6,126,542 | A | 10/2000 | Fier |
| 6,141,006 | A | 10/2000 | Knowlton et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,189,886 | B1 | 2/2001 | Moran |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,279 | B1 | 4/2001 | Dickinson |
| 6,213,876 | B1 | 4/2001 | Moore, Jr. |
| 6,224,483 | B1 | 5/2001 | Mayeroff |
| 6,231,442 | B1 | 5/2001 | Mayeroff |
| 6,231,445 | B1 | 5/2001 | Acres |
| 6,251,013 | B1 | 6/2001 | Bennett |
| 6,261,177 | B1 | 7/2001 | Bennett |
| 6,290,600 | B1 | 9/2001 | Glasson |
| 6,302,790 | B1 | 10/2001 | Brossard |
| 6,305,686 | B1 | 10/2001 | Perrie et al. |
| 6,309,300 | B1 | 10/2001 | Glavich |
| 6,328,649 | B1 | 12/2001 | Randall et al. |
| 6,331,148 | B1 | 12/2001 | Krause et al. |
| 6,358,149 | B1 | 3/2002 | Schneider et al. |
| 6,375,187 | B1 | 4/2002 | Baerlocher |
| 6,398,218 | B1 | 6/2002 | Vancura |
| 6,413,160 | B1 | 7/2002 | Vancura |
| 6,413,161 | B1 | 7/2002 | Baerlocher et al. |
| 6,419,579 | B1 | 7/2002 | Bennett |
| 6,435,511 | B1 | 8/2002 | Vancura et al. |
| 6,439,993 | B1 | 8/2002 | O'Haloran |
| 6,439,995 | B1 | 8/2002 | Hughs-Baird et al. |
| 6,450,887 | B1 | 9/2002 | Mir et al. |
| 6,461,241 | B1 | 10/2002 | Webb et al. |
| 6,464,582 | B1 | 10/2002 | Baerlocher et al. |
| 6,494,785 | B1 | 12/2002 | Gerrard et al. |
| 6,506,118 | B1 | 1/2003 | Baerlocher et al. |
| 6,514,141 | B1 | 2/2003 | Kaminkow et al. |
| 6,517,432 | B1 | 2/2003 | Jaffe |
| 6,527,270 | B2 | 3/2003 | Maksymec et al. |
| 6,551,187 | B1 | 4/2003 | Jaffe |
| 6,554,704 | B2 | 4/2003 | Nicastro et al. |
| 6,561,899 | B2 | 5/2003 | Vancura |
| 6,565,442 | B2 | 5/2003 | La Mura et al. |
| 6,569,015 | B1 | 5/2003 | Baerlocher et al. |
| 6,575,830 | B2 | 6/2003 | Baerlocher et al. |
| 6,585,591 | B1 | 7/2003 | Baerlocher et al. |
| 6,595,854 | B2 | 7/2003 | Hughs-Baird et al. |
| 6,599,192 | B1 | 7/2003 | Baerlocher et al. |
| 6,602,137 | B2 | 8/2003 | Kaminkow et al. |
| 6,620,045 | B2 | 9/2003 | Berman et al. |
| 6,632,141 | B2 | 10/2003 | Webb et al. |
| 6,648,754 | B2 | 11/2003 | Baerlocher et al. |
| 6,648,758 | B2 | 11/2003 | Bennett et al. |
| 6,659,864 | B2 | 12/2003 | Mc Gahn et al. |
| 6,692,355 | B2 | 2/2004 | Baerlocher et al. |
| 6,695,696 | B1 | 2/2004 | Kaminkow |
| 6,719,632 | B2 | 4/2004 | Palmer et al. |
| 6,722,981 | B2 | 4/2004 | Kaminkow et al. |
| 6,722,982 | B2 | 4/2004 | Kaminkow et al. |
| 6,726,563 | B1 | 4/2004 | Baerlocher et al. |
| 6,758,750 | B2 | 7/2004 | Baerlocher et al. |
| 6,776,711 | B1 | 8/2004 | Baerlocher et al. |
| 6,786,820 | B2 | 9/2004 | Gerrard et al. |
| 6,793,579 | B2 | 9/2004 | Baerlocher et al. |
| 6,796,903 | B1 | 9/2004 | Bryant |
| 6,796,905 | B2 | 9/2004 | Baerlocher et al. |
| 6,808,452 | B2 | 10/2004 | Baerlocher et al. |
| 6,808,454 | B2 | 10/2004 | Gerrard et al. |
| 6,811,483 | B1 | 11/2004 | Webb et al. |
| 6,899,623 | B2 | 5/2005 | Baerlocher |
| 6,966,833 | B2 | 11/2005 | Kaminkow et al. |
| 2002/0045475 | A1 | 4/2002 | Glavich et al. |

| | | | |
|---|---|---|---|
| 2002/0072402 | A1 | 6/2002 | Baerlocher |
| 2002/0142821 | A1 | 10/2002 | Baerlocher et al. |
| 2002/0151350 | A1 | 10/2002 | Baerlocher et al. |
| 2002/0153656 | A1 | 10/2002 | Maksymec et al. |
| 2002/0155883 | A1 | 10/2002 | Baerlocher |
| 2002/0177480 | A1 | 11/2002 | Rowe |
| 2002/0187827 | A1 | 12/2002 | Blankstein |
| 2003/0013514 | A1 | 1/2003 | Cregan et al. |
| 2003/0040355 | A1 | 2/2003 | Baerlocher |
| 2003/0040360 | A1 | 2/2003 | Kaminkow |
| 2003/0045344 | A1 | 3/2003 | Webb et al. |
| 2003/0045348 | A1 | 3/2003 | Palmer et al. |
| 2003/0045350 | A1 | 3/2003 | Baerlocher et al. |
| 2003/0060260 | A1 | 3/2003 | Gerrard et al. |
| 2003/0064795 | A1 | 4/2003 | Baerlocher et al. |
| 2003/0064807 | A1 | 4/2003 | Walker et al. |
| 2003/0087693 | A1 | 5/2003 | Baerlcoher et al. |
| 2003/0090063 | A1 | 5/2003 | Jarvis et al. |

FOREIGN PATENT DOCUMENTS

| | | |
|---|---|---|
| EP | 0 926 645 A2 | 6/1999 |
| EP | 0 944 030 A2 | 9/1999 |
| EP | 0 945 837 A2 | 9/1999 |
| EP | 0 981 119 A2 | 2/2000 |
| EP | 0 984 408 A2 | 3/2000 |
| EP | 1 298 609 A2 | 4/2003 |
| EP | 1 175 928 A2 | 7/2004 |
| WO | WO 9732285 | 9/1997 |
| WO | WO 00/12186 | 3/2000 |

OTHER PUBLICATIONS

Addams Family Advertisement, written by IGT, published in 2000.
Addams Family Article, written by Strictly Slots, published in 2000.
Adders and Ladders Advertisement, written by Barcrest Ltd., published prior to 2000.
American Bandstand Article, written by Strictly Slots, published in 2002.
American Thunder Screen Shots, written by IGT, published in 1998.
Big Bang Piggy Bankin Advertisement, written by Hoyle's Rules of Games, published in 2000.
Blackjack/Twenty-One Description, written by Hoyle's Rules of Games, published in 1993.
Bonus Spin Red, White & Blue Advertisement, written by IGT, published in 2000.
Bonus Times Article, written by Strictly Slots, published in 2000.
By George, written by IGT, published in 2002.
Caribbean Gold II Advertisement, written by Aristocrat Incorporated, published in 1998.
Cash Box Advertisement & Article, written by Anchor Games, Strictly Slots, published in 2000.
Cash for Life—Offer Bonus Advertisement/Lotsa Loot Advertisement/Take It or Leave It Advertisement, written by Bally Gaming, published in 2003.
Cash for Life—Triple Spin Bonus Article, written by Strictly Slots, published in 2003.
Chutes & Ladders Game Instructions, written by Hasbro-Milton Bradley, published in 1999.
Deep Pockets Advertisement, written by IGT, published in 2002.
Deep Pockets Article, written by Strictly Slots, published in 2002.
Description of Let's Make a Deal Television Show, written by letsmakeadeal.com, printed on Mar. 16, 2001.
Double Diamond Game Descriptions, written by IGT printed on Mar. 21, 2001.
Double Top Dollar Advertisement, written by IGT, published in 2003.
Double Up Poker Game Description, written by IGT published prior to Nov. 2001.
Easy Street Advertisements and Articles, written by Casino Data Systems, published in 2000.
Elvis Advertisement, written by IGT, published in 1999.
Empire Game Advertisement, written by AC Coin, published in 1996.
Fire and Fortune Article, written by Strictly Slots, published in May 2001.
Fox "N" Hound Advertisement, written by IGT, published in 2000.
Hollywood Advertisement, written by Shuffle Master Gaming, published in 2001.
In Between Game Description, written by IGT, available prior to 2000.
Jackpot Party Advertisements and Articles, written by WMS Gaming, Inc., published in 1998.
Keep Your Hat On Advertisement, written by Aristocrat, published in Mar. 2001.
Keep Your Hat on Article, written by Strictly Slots, published in Mar. 2001.
Let's Make a Deal, written by geocities.com, printed on Mar. 21, 2001.
Let's Make a Deal, written by fortunecity.com, printed on Mar. 21, 2001.
Let's Make a Deal, written by Illinoislottery.com, printed on Mar. 21, 2001.
Let's Make a Deal, written by geocities.com, printed on Mar. 16, 2001.
Let's Make A Deal Advertisement, written by Shuffle Master and IGT, published in 2001.
Let's Make a Deal Game Advertisement, written by Bally Gaming Systems, published in 1999.
Little Green Men Advertisement, written by IGT, published in 2000.
Little Green Men Article, written by Strictly Slots, published in Jul. 2000.
MegaJackpots Advertisement, written by IGT, published in 1998.
Money Grab Article, written by Strictly Slots, published in Apr. 2001.
Money in the Bank Advertisement, written by Strictly Slots Konami, published in Jun. 2001.
Monopoly Advertisements and Articles, written by WMS Gaming, Inc., published in 1998, 1999.
Monopoly Movers & Shakers, written by Strictly Slots, published in Jul. 2000.
Neon Nights, written by IGT, published in 2000.
On the Money Article, written by Strictly Slots, Casino Data Systems, published in Dec. 2000.
Polly & Roger Advertisement, written by VLC, Inc., published in 2000.
Press Your Luck Advertisement, written by Shuffle Master Gaming, published in 2000.
Press Your Luck Article, written by Strictly Slots, published in 2000.
Price is Right "Cliff Hangers" Description, written by www.geocities.com; members.aol.com, printed Mar. 21, 2001.
Price is Right "Showcases" Description, written by schuminweb.com, printed Mar. 16, 2001.
Psycho Cash Beast Advertisement, written by IGT, published in 1999.
Psycho Cash Beast Club, written by Barcrest, published prior to 1998.
Richard Petty Advertisement, written by IGT, published in 2000.
South Park—Dodgeball Advertisement, written by IGT, published in 2000.
Spell Binder Advertisement, written by IGT, published in 2000.
Sphinx Advertisement, written by Atronic Casino Technology, Ltd., published in 1997.
Take Your Pick Article, written by Strictly Slots, published in Mar. 2001.
Take Your Pick Advertisement, written by IGT/Anchor Gaming, published in 1999.
Texas Tea Advertisement, written by IGT, published in 2000.
The Deals of Let's Make a Deal, written by fortunecity.com, printed on Jul. 20, 2004.
The Official Let's Make a Deal Website, written by Bally Gaming System Website, printed on Mar. 16, 2001.
Three Wishes Article, written by Strictly Slots, published in 2000.
Top Cat Advertisement, written by WMS Gaming, Inc., published prior to 2000.

Top Dollar Advertisement, published by IGT, 1998.
Totem Pole Advertisement, written by IGT, published in 1997.
Treasure Wheel/Treasure Tunnel Advertisement, written by Sigma Game, Inc., published prior to 2000.
Wheel of Fortune Advertisement, written by IGT, published in 1998.
Wheel of Fortune Advertisement, written by IGT, published in 1999.
Wheel Poker Article, written by Strictly Slots, published in Nov. 2000.
X Factor Advertisement and Website Page, written by WMS Gaming, Inc., published in 1998.

FINANCIAL TRADING GAME

PRIORITY CLAIM

This application is a continuation application of, claims priority to and the benefit of U.S. patent application, Ser. No. 10/002,553, filed on Nov. 23, 2001, now U.S. Pat. No. 7,040,982 the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

This invention brings the excitement of trading securities on an exchange to an electronic game. A player is able to experience the excitement and unpredictability of electronic trading by condensing months, days or hours of trading activity into a relatively short amount of time. The game provides the player with a line chart that shows changes in value of one or more securities, such as stocks, commodities, options, bonds, futures, indexes, currencies and the live, over a period of time. A segmented line is plotted on the line chart during a round of play. This segmented line is composed of a plurality of points that are joined together by line segments, each point representing a randomly generated, hypothetical item price or value at a given point in time. A round of play begins when the player "buys", and ends either when the player "sells", or when the time period allotted for playing the round of play expires.

Where the invention is implemented on a video gaming machine for gambling purposes, this fast-paced and unpredictable game both maximizes the amount of revenue generated by the house, and maintains the game at a level challenging enough to keep the player interested.

Several stock market-related games have been devised which simulate investing in the stock market game that simulates buying and selling stock on a stock exchange. The player is provided with a display that presents a number of stocks, their current prices, dividends, and information relating to market factors that, interalia, affect the price of the stocks. The player is also provided with a keyboard for initiating stock-related transactions such as buying, selling, placing puts, and the like.

Board games have also been devised which simulate investing in the stock market. For example, U.S. Pat. No. 6,189,886 provides a board game that is based on the stock market concepts. A continuous path of variably colored spaces is depicted on the face of the board game, wherein the spaces have different meanings and applications to game play. As each player moves around the game board, they are given the opportunity to buy and sell stock and to draw cards which express events which cause the price of a specified stock to go up or down.

However, all of the previously devised stock market-related games have complex designs, as well as complicated rules, which are neither realistic nor extremely interesting. In addition, these games can complicate play with sophisticated concepts and transactions, which are geared more towards players with extensive prior knowledge and an understanding of the complexities of trading on an exchange. Furthermore, these previously devised games require a great deal of time to complete a single round of play, which is not conducive to a casino environment.

There is a constant need in the gaming industry for new games that keep plays interested, and substantially reduce the possibility that players will cease playing and wagering or reduce the amount of play and wagering due to lack of interest or challenge.

Therefore, it is a first object of the present invention to provide an electronic game that captures the excitement of trading securities or other financial instruments, currencies or commodities or an exchange.

It is a second object of the present invention to provide a market-related electronic game that is easy to play, and requires a minimal knowledge of the workings of an exchange.

It is a third object of the present invention to provide a financial market-related game that can be implemented on a video gaming machine in a casino for gambling purposes.

Yet another object of the present invention is to provide a financial market-related electronic game that provides a player with a line chart that shows changes in trading patterns of one or more securities, such as stocks, commodities, options, currencies, and the like, over a period of time.

Another object of the present invention is to provide a financial market-related electronic game having a line chart that includes a plurality of special event icons which, when intersected by a segmented line plotted on the line chart, affect the price or value of the security, commodity or currency or reward the player with a bonus round of play.

SUMMARY

Additional features and advantages are described herein, and will be apparent from, the following Detailed Description and the figures.

This invention relates generally to a game, and more particularly to an electronic game that simulates trading securities, commodities, or currencies on a public exchange, such as a stock exchange, futures exchange, commodities exchange, options exchange, index exchange, bond exchange and the like. More particularly, the game simulates changes in value of an item traded on an exchange, over a period of time. The game of the present invention can be played on any electronic computing device, but is preferably played in a casino as a video gaming machine for gambling purposes. The computing device includes, among other things, a video screen display on which a line chart is displayed. The computing device also includes a selection device, which provides a means by which the player interacts with the computing device to, among other things, "buy" or "sell" one or more securities, commodities or currencies. The line chart includes a vertical axis that corresponds to the value of the security or other item being traded, and a horizontal axis that corresponds to time. A segmented line is plotted on the line chart during a round of play. A random number generator randomly determines the vertical axis value for each point plotted along the segmented line.

During play, the segmented line may "intersect" one of the plurality of "special event" icons displayed on the line chart. If the segmented line intersects one of the special event icons, a "special event" is triggered. Depending on the icon type intersected, the value of the security is increased, decreased, the player is rewarded with a bonus round of play, or other special action initiated.

A round of play begins when a player "buys" one or more securities or other items being traded, such as stocks, commodities, currencies, options, bonds, futures, indexes or the like. The player then watches the plotting of the segmented line of the line chart. In other words, the player watches the value of the one or more securities, commodities or currencies change over time. If the player feels the chart is at a peak value, or on a downward trend he activates the "sell" button to lock in profits or reduce potential losses. A round of play ends either when the player "sells" the one or more securities, commodities or currencies, or when the time allotted for the round of play expires.

BRIEF DESCRIPTION OF THE FIGURES

Other objects and advantages of the invention will become apparent upon reading the following detailed description and upon reference to the drawings in which.

DETAILED DESCRIPTION

Figure 1:
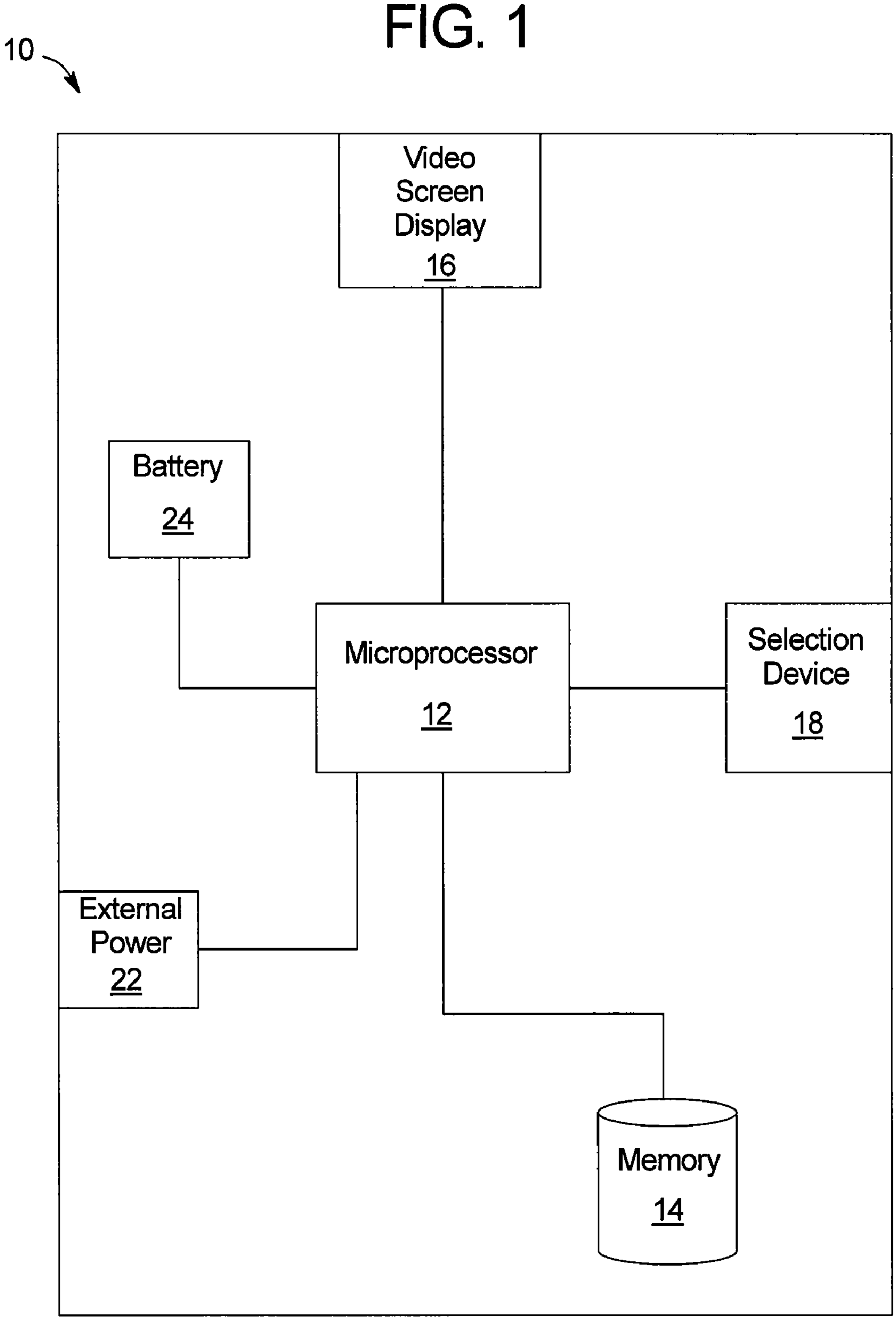
FIG. 1 is a schematic diagram of a computing device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

While this invention is susceptible of embodiment in many different forms, there is shown in the drawings and will herein be described in detail, one or more specific embodiments, with the understanding that the present disclosure is to be considered merely an exemplification of the principles of the invention and is not intended to limit the invention only to the embodiments described and illustrated.

The game of the present invention can be played on any electronic computing device. The game is most preferably played in a casino as a video gaming machine for gambling purposes. Alternatively, it can be played on a computer as an on-line gaming game over the Internet as part of a Wide Area Network ("WAN"), as part of a Local Area Network ("LAN"), and/or on a stand-alone computer.

FIG. 1 is a schematic diagram of a computing device 10 with which the present game is implemented. The computing device 10 includes a microprocessor 12 for executing one or more programs stored in the device's memory 14, a video screen display 16, a selection device 18 for providing a means by which the player interacts with the computing device 10, and an external power supply 22 and/or a battery 24 in electrical communication with each of the above-noted components for providing electrical power thereto. The memory 14, video screen display 16, and selection device 18 are each in communication with the microprocessor 12.

The selection device 18 may be a keypad, a peripheral device such as an external keyboard or mouse, and/or a plurality of function specific buttons. In the preferred embodiment, the video display screen 16 is a touch screen that serves as both the selection device 18 and the video screen display 16. In this embodiment, the selection device 18 takes the form of "interactive" icons that appear on the video screen display 16. When the player touches the video screen display 16 at the location where an "interactive" icon is displayed, this has the same affect as if the player were pushing a conventional electro-mechanical keypad button.

Figure 2:
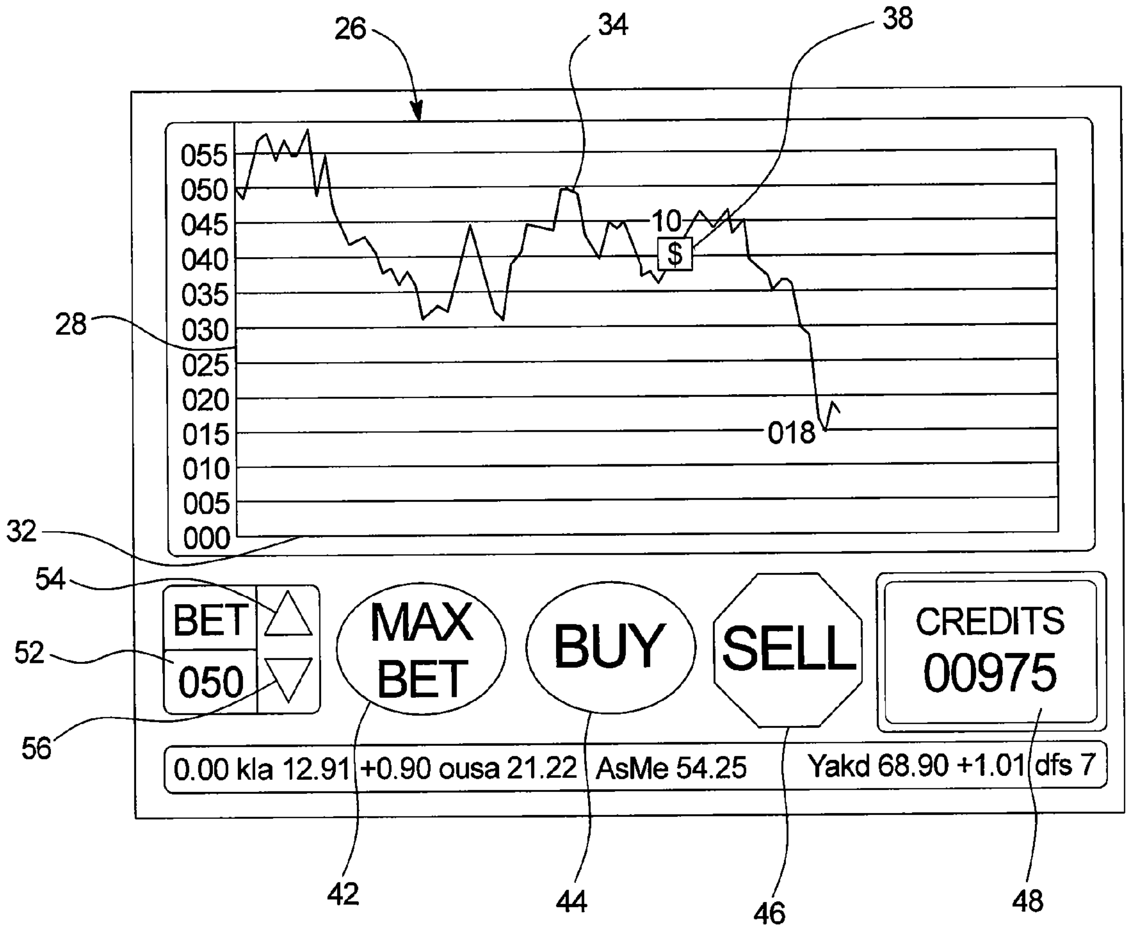
FIG. 2 is an illustration of a screen display of a first example of a completed round of play.

FIG. 2 is an illustration of a screen display of a completed round of play, as viewed on the touch screen video screen display 16. The screen display 16 includes a two-dimensional line chart 26. The vertical axis 28 of the line chart 26 denotes the value or price of one or more securities or other item being traded, such as a stock, commodity, currency, option, bond, future, index and the like (referred to collectively as "security" or "securities"), and the horizontal axis 32 denotes time. Preferably, at least initially, the value or price of the security corresponds to the number of "credits" wagered. A "credit" may be a fictional amount, or in the case where actual money is wagered, may correspond to the amount of money wagered.

As will be further discussed below, a segmented line 34 is plotted on the line chart 26 during a round of play, and in a relatively short period of time. Preferably, the total time allotted to plot the entire segmented line 34 is long enough to allow the player to react to what is going on and keep the player interested, a time period between and few seconds and a few minutes. In the preferred embodiment it is 3-10 seconds. The time for a round should be short enough that enough revenue can be generated within the allotted time. It should be noted that although only one line chart 26 is shown in the drawings, alternate embodiments are contemplated wherein multiple line charts 26 are displayed, each having a segmented line 34. Yet another embodiment is contemplated wherein multiple segmented lines 34 are plotted on a single line chart 26.

The segmented line 34 is plotted by line plotting means. In the preferred embodiment, the line plotting means is a random number generator, most preferably a random walk function. The segmented line 34 is composed of a plurality of points jointed together by line segments. For each point plotted, a vertical axis change value (which can be positive or negative) is computed using the random number generator. This change value is then added to the previously plotted vertical axis value to form the new vertical axis value. This new vertical axis value and the next sequential corresponding horizontal axis value are then plotted as a new point on the line chart 26. In other words, a fictitious security value is randomly generated for a given moment in time, and those values are plotted as a point on the line chart 26, A line segment is then drawn between the new point and a previously plotted point.

In the preferred embodiment, the segmented line 34 is plotted at a constant rate, and the points are equidistantly spaced along the horizontal axis. In other words, the rate or speed of the game is constant. However, alternate embodiments are contemplated wherein the rate at which the points are plotted varies during play.

Where, as in the preferred embodiment, the game is played in a casino as a video gaming machine, the game may be configured so that the odds of winning favor the casino or "house". This can be accomplished by introducing a negative bias into the random number generator. The negative bias will cause the vertical axis or security value to decrease more frequently than it increases over a large number of games.

In the preferred embodiment, revenue can be earned by the casino or "house" by reducing the player's winnings by a "commission". The "commission" may be a predetermined percentage of the initial bet, a percentage of the winnings, or a combination thereof. The "commission" could also be deducted as each point is plotted, so that the "commission" is gradually paid as the round of play progresses.

One or more special event icons are displayed on the line chart 26. The appearance, timing, type and placement of the special event icons can be controlled by a random number generator, or placed in fixed locations. In the preferred embodiment, if the segmented line 34 "intersects" one of the special event icons, such as 38 of FIG. 2, a special event is triggered. Depending on the icon type intersected, the vertical axis or security value is increased or decreased, and the player is rewarded with a bonus round of play, or other special action is initiated.

Figure 8:
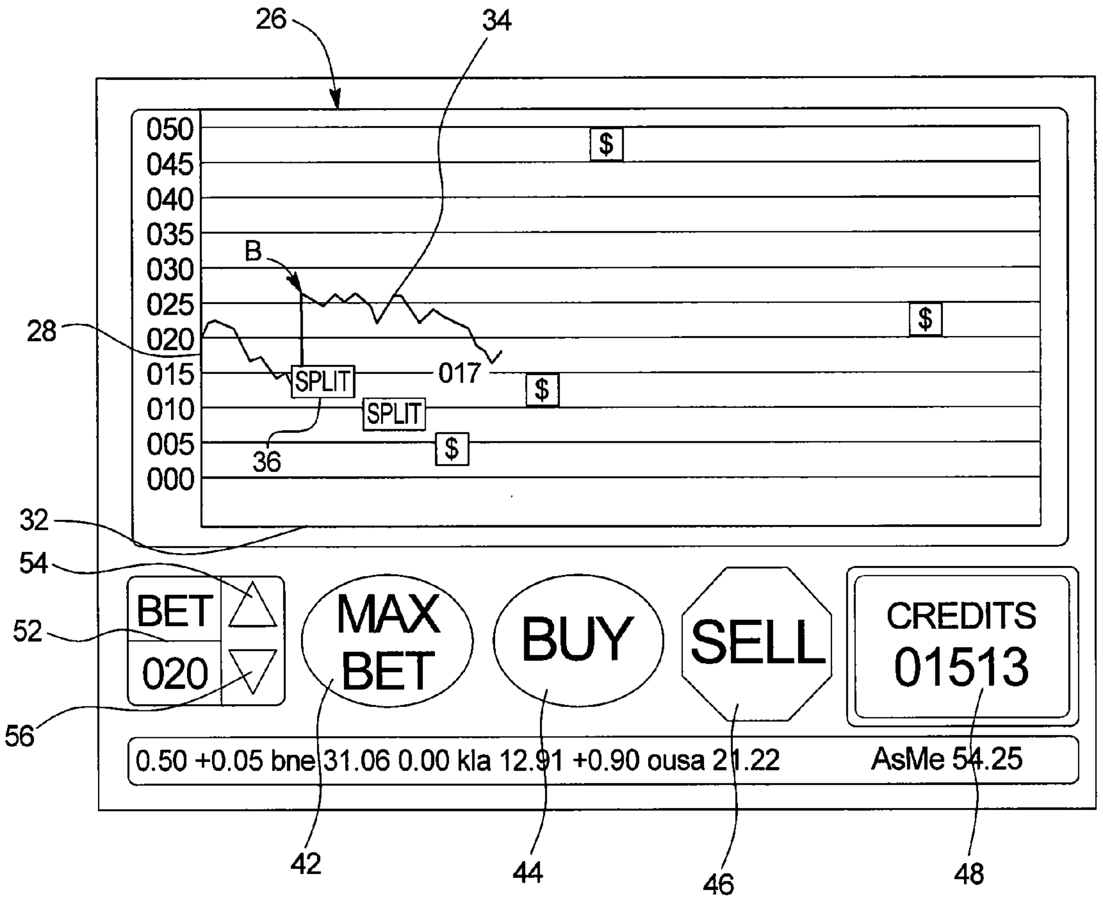
FIG. 8 is an illustration of a screen display of a fourth example of a completed round of play.

As the segmented line 34 is plotted during play, if a point is plotted at the same location as a special even icon (and thus the segmented line 34 "intersects" the special event icon 38), a "special function" associated with that particular special event icon is initiated. A point plotted at the same location as a special event icon is herein referred to as an "intersecting point", and the corresponding special event icon is herein referred to as a n "intersected icon".

Where the intersected special event icon is one that affects the security value, the "special function" associated with the intersected special event icon disables the random number generator with respect to the next point to be plotted, and then instead computes the vertical axis value for the next point. The preferred embodiment includes three types of value-affecting special event icons. The first is a "SPLIT" special event icon 36 (see FIG. 8). The "special function" associated with a "SPLIT" special event icon 36 computes the vertical axis value for the next point to be plotted by doubling the vertical axis value for the intersecting point. As shown in FIG. 8, intersecting SPLIT icon 36 results in the security value jumping from point A to pint B.

The second type is a "cash bonus" special event icon 38 (depicted in FIG. 2 as a dollar sign or "$"). In one embodiment, the "special function" associated with the "cash bonus" special event icon 38 computes the value for the next point to be plotted by adding a predetermined value to the vertical axis value for the intersecting point. In other words, the security value increases by a predetermined amount, which is displayed on the "cash bonus" icon 38 during play. In another embodiment, a bonus value random generator randomly generates the value to be added to the intersecting point vertical axis value.

The third type of value affecting special event icon is a "CRASH" special event icon (not shown). The "special function" associated with a "CRASH" special event icon computes the vertical value for the next point to be plotted as zero. In other words, when the segmented line 34 intersects a "CRASH" special event icon, the value of the security value plummets to zero. The rate and effect of a "CRASH" icon can also be varied. Where the intersected special event icon is one that rewards the player with a "bonus game", a bonus game is initiated where the player can win additional credits.

Referring again to FIG. 2, "MAX BET", "BUY" and "SELL" interactive buttons 42, 44, and 46, respectively, are displayed on the video screen 16. A "CREDIT" display 48 provides the player with a visual display of the total number of credits available to bet or wager with. A separate "BET" display 52 provides the player with a visual display of the total number of credits bet or wagered for the game cycle. Bet increase and decrease interactive buttons 54 and 56, respectively, permit the player to increase and decrease the number of credits bet or wagered.

Figure 3:
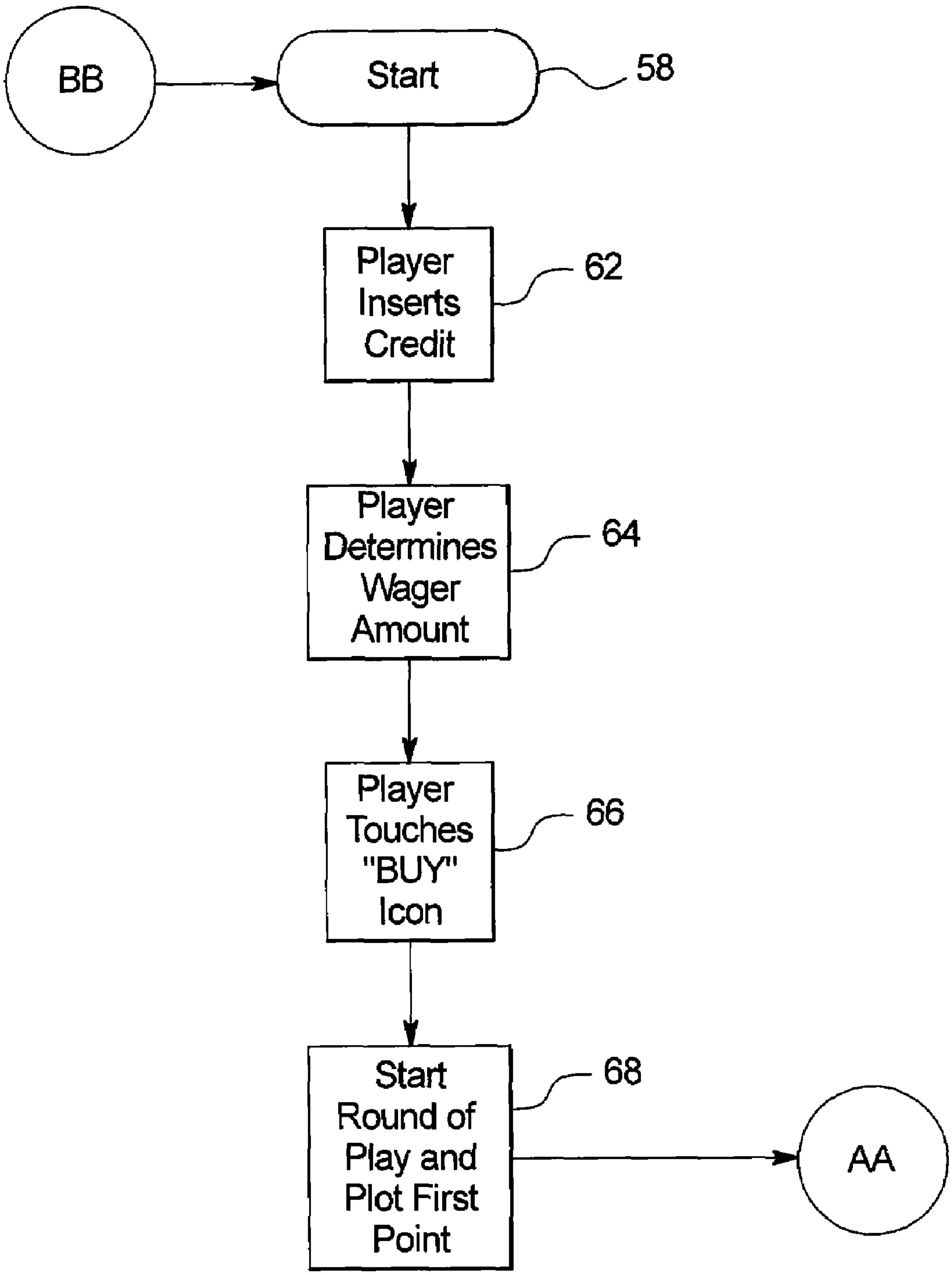
FIG. 3 is a flow diagram of a first method by which a round of play is initiated.

FIG. 3 generally describes one method by which a round of play is initiated. In this embodiment, the computing device 10 is the preferred video gaming machine. After start 58, but before the round of play begins, the player inserts "credits" 62 into the computing device 10. These credits may take the form of coins, or could be deducted from a stored value card, a ticket, a debit car, a credit card, or a smart card. Thereafter, the player determines the amount to be wagered 64 for the upcoming game. This can be accomplished two ways. First, the player can touch the "MAX BET" interactive button 42, in which case the maximum allowed bet is wagered. In the alternative, the player can select the amount to be wagered using the bet increase and decrease interactive buttons 54 and 56. Once the amount wagered is selected 64, the player touches the "BUY" interactive button 44, 66 to initiate the round of play 72. When the round of play is initiated 68, the first point is plotted. The vertical axis value of the first plotted point corresponds to the number of credits wagered.

Figure 4:
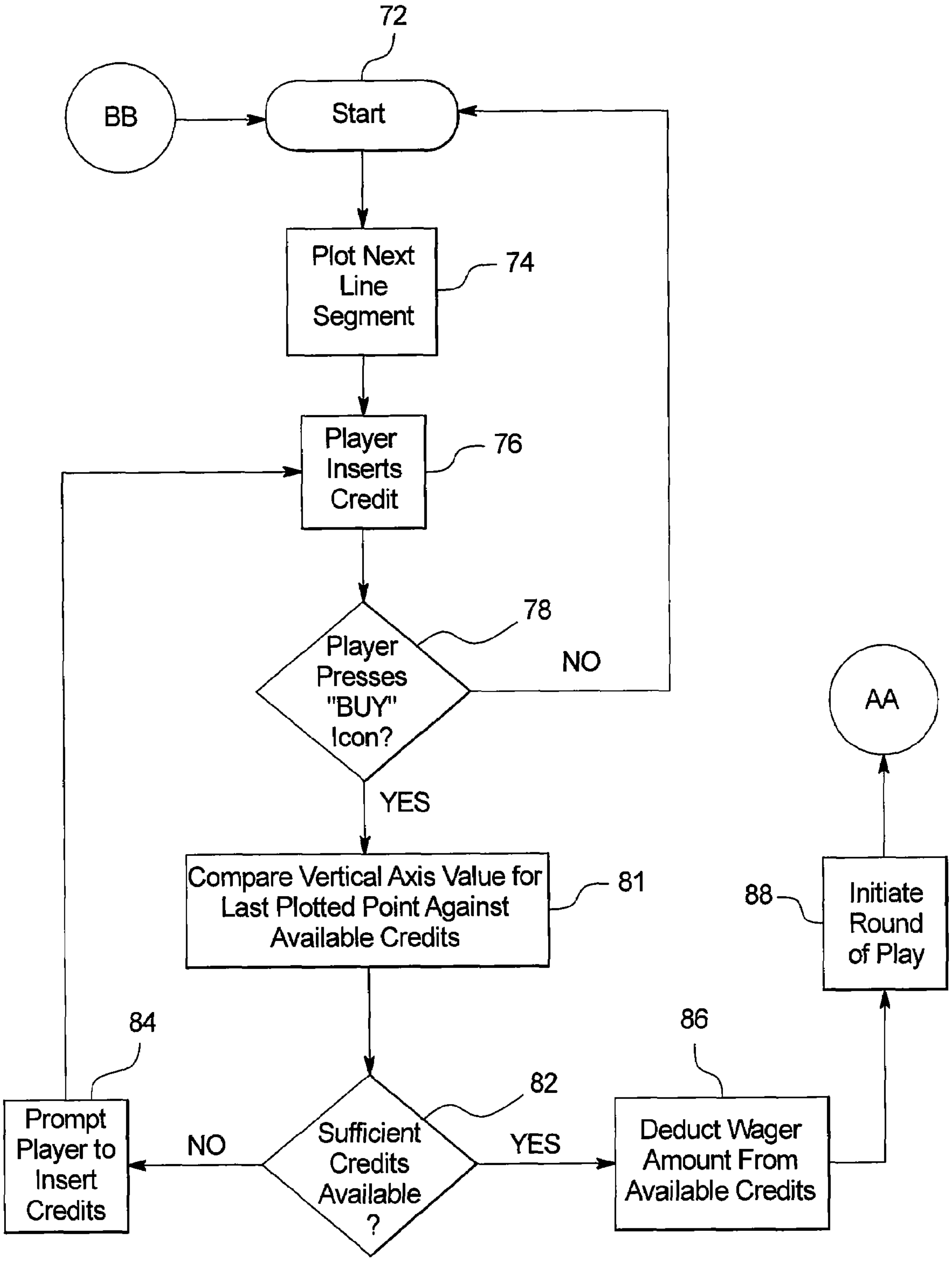
FIG. 4 is a flow diagram of a second method by which a round of play is initiated.

FIG. 4 generally describes a second method by which the round of play may be initiated. In this embodiment, the computing device 10 is again the preferred video gaming machine. However, in this embodiment, the segmented line 34 is continuously plotted 74, even before a round of play begins. The player inserts "credits" 76 into the computing device 10. When the player touches the "BUY" interactive button 44, 78, the vertical axis value for the last point plotted before the player touched the "BUY" interactive button 44 is compared against the number of available "credits" 81 to determine whether the player has a sufficient number of credits to "buy" at that given moment in time 82.

An alternate embodiment is contemplated wherein the player can "short sell" a security. Selling short is a method for trading a security wherein an investor in effect borrows the security from a broker, immediately sells the security, and then at a later time buys the security and effectively returns it to the broker. If the value of the security decreases after the investor initially sells the security (and the investor is able to later buy the security at a lower price) then the investor will realize a profit. In that embodiment, the player touches the "SELL" interactive button 46 rather than the "BUY" interactive button 44, without having previously "bought" the security.

If the player does not have a sufficient number of credits, the computing device prompts the player to inset more credits 84. IF the player does have a sufficient number of credits, then the vertical axis or security value is automatically deducted from the total number of "credits" available 86, and the round of play is initiated 88. The number of "credits" deducted corresponds to the vertical axis value for the last point plotted before the player touched the "BUY" interactive button 44, 88. Also, the last point plotted before the player touched the "BUY" interactive button 44 is counted as the first plotted point in the round of play.

Figure 5:
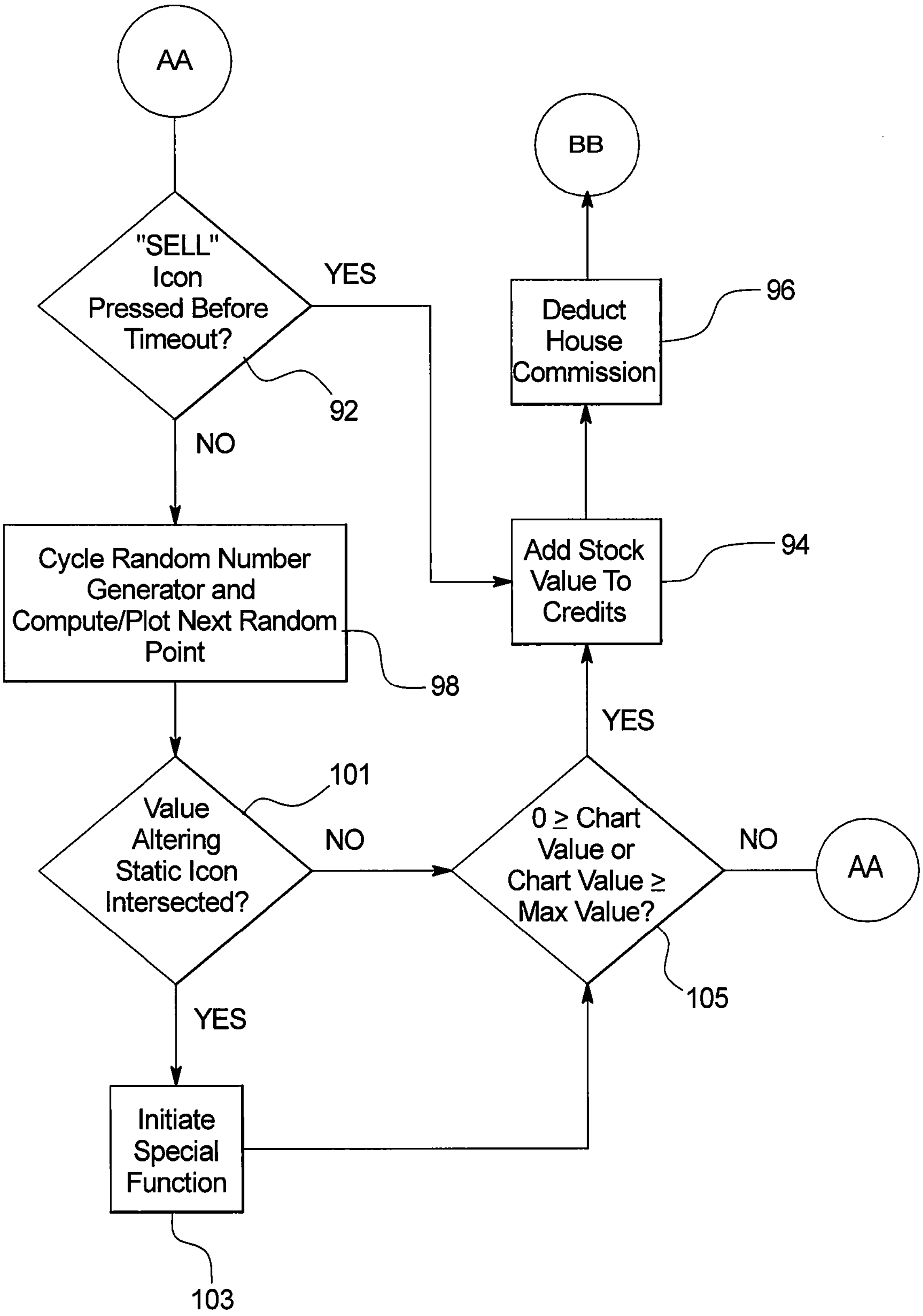
FIG. 5 is a flow diagram generally describing a round of play.

Referring to FIG. 5, in both embodiments, after the round of play has been initiated 68, 88, the processing loop starting at "AA" is invoked. First the "SELL" button 46 is checked for activation, and time expired condition is tested 92. If either event occurred, then the round is terminated, the current vertical axis or security value is added to player credits 94, house commission is deducted 96, ending the current round of play. Otherwise, the random number generator is cycled and computes the vertical axis value for the next point and it is plotted 98. It is then determined whether the new plotted point is an intersecting point 101. If the next point is an intersecting point, then the "special function" associated with the intersected special event icon is executed 103. Where the special event icon is one that affects the value of the security, the "special function" alters the vertical axis value for the chart at the current point. Next the chart value is check to see if it has equaled or exceeded the maximum and minimum chart values 105. If so, round termination 107 is commenced, the current vertical axis or security value is added to player credits 94, house commission is deducted 96, ending the current round of play.

To provide a further understanding of the present invention, the following examples are provided with the understanding that these examples merely demonstrate the implementation of one or more embodiments of the invention.

FIG. 2 illustrates a screen display of a completed round of play in which the casino or "house" won. The round of play was initiated using the first of the two above-discussed methods. The player initially wagered 50 credits, and thereafter touched the "BUY" interactive button 44. Thereafter, the computing device 10 plotted the first point, which had a vertical axis value of 50. During play, the segmented line 34 "intersected" a "cash bonus" special event icon 38 having a bonus value of 10 credits. The round of play ended when the player touched the "SELL" interactive icon 46, at which point the security had a value of 18 credits. The outcome in this case is not favorable to the player because the net result is the "SELL" value of 18 minus the original 50 credits wagered on the "BUY", a negative result representing a loss of 32 credits.

Figure 6:
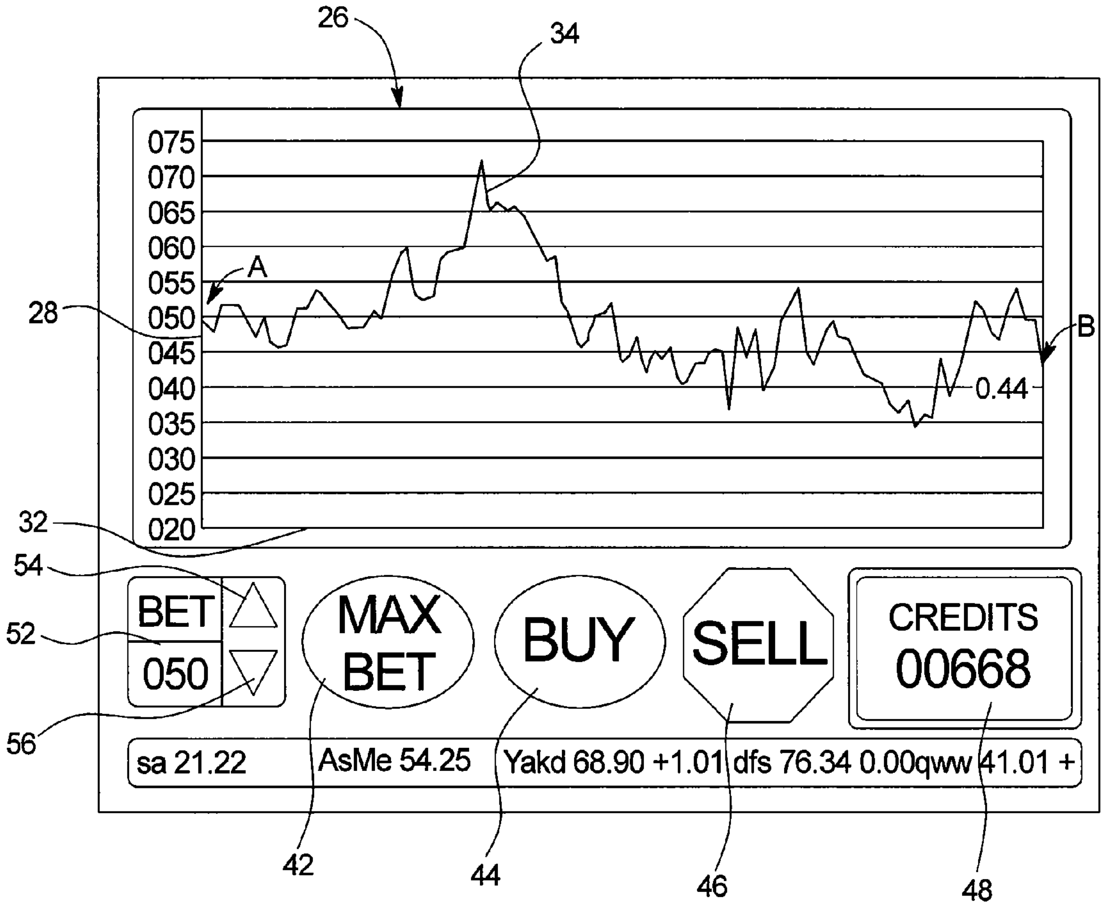
FIG. 6 is an illustration of a screen display of a second example of a completed round of play.

FIG. 6 illustrates a screen display of a completed round of play in which the casino or "house" again won. The round of play was initiated using the first of the two above-discussed methods. The player initially wagered 50 credits, and thereafter touched the "BUY" interactive button 44. Thereafter, the computing device 10 plotted the first point A, which had a vertical axis value of 50. The round of play ended when the time allotted for a given round of play expired, at which point B the chart had a value of 44 credits. The net outcome to the player was a loss of 6 credits.

Figure 7:
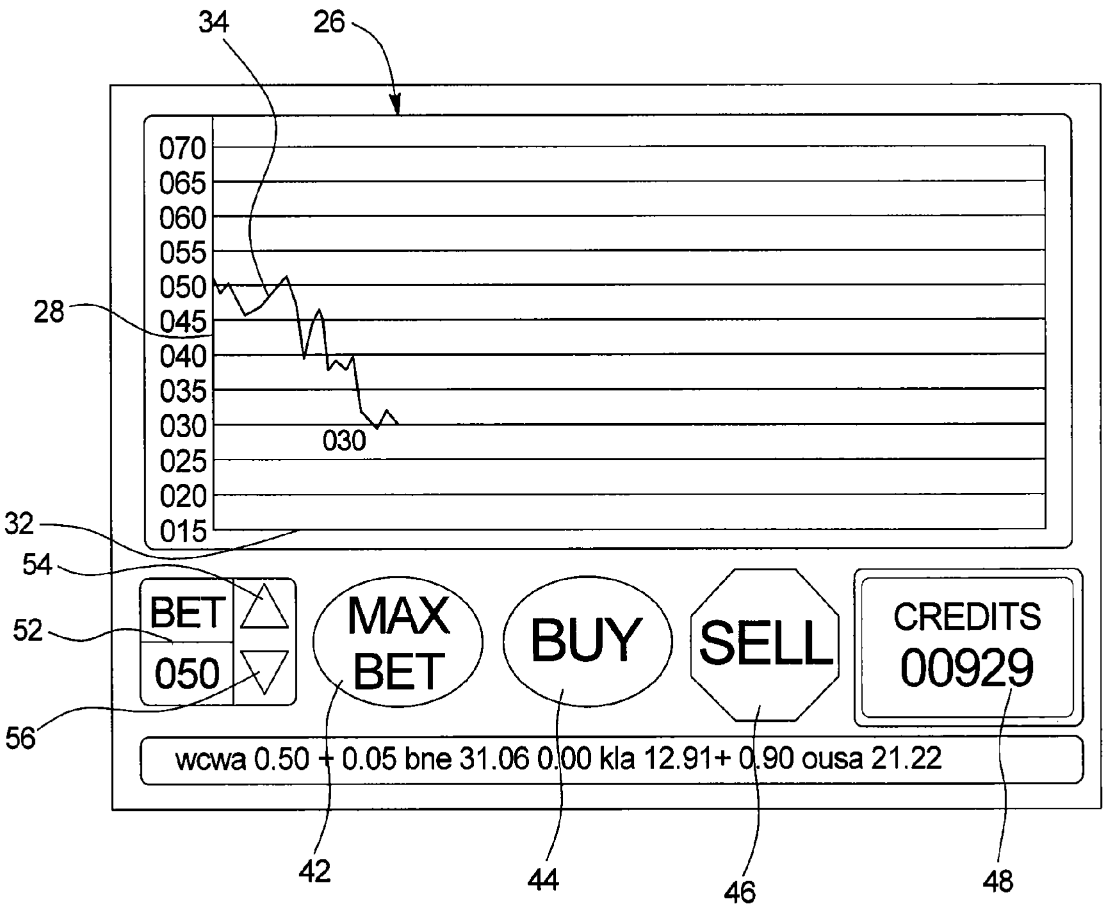
FIG. 7 is an illustration of a screen display of a third example of a completed round of play.

FIG. 7 illustrates a screen display of a completed round of play in which the casino or "house" again won. The round of play was initiated using the first of the two above-discussed methods. The player initially wagered 50 credits, and thereafter touched the "BUY" interactive button 44. The round of play ended when time expired at which point the security had a value of 30 credits. The net outcome to the player was a loss of 20 credits.

FIG. 8 illustrates a screen display of a completed round of play in which the casino or "house" again won. The round of play was initiated using the first of the two above-discussed methods. The player initially wagered 20 credits, and thereafter touched the "BUY" interactive button 44. Thereafter, the computing device 10 plotted the first point, which had a vertical axis value of 20. During play, the segmented line 34 "intersected" a "SPLIT" special event icon 36, which caused the value of the security to double from 13 at A to 26 at B. The round of play ended when the player touched the "SELL" interactive button 46, at which point the security had a value of 17 credits. The net outcome to the player was a loss of 3 credits.

Figure 9:
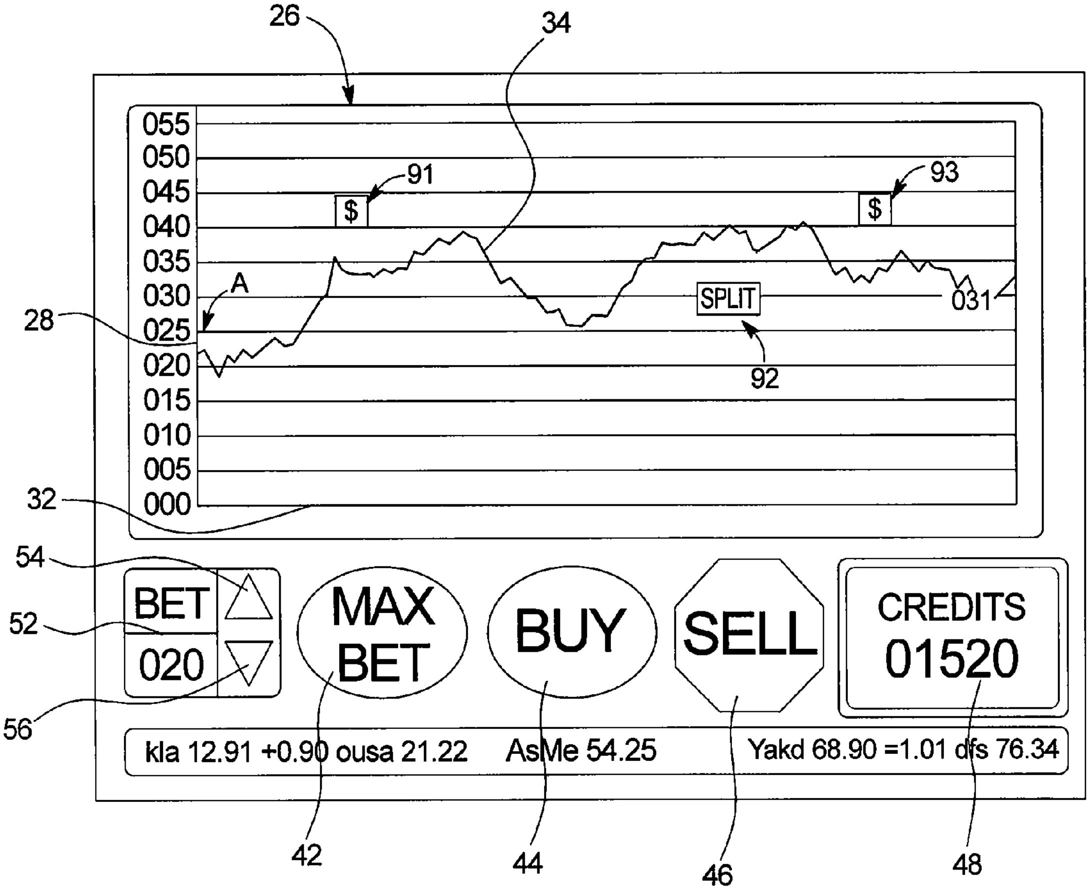
FIG. 9 is an illustration of a screen display of a fifth example of a completed round of play.

FIG. 9 illustrates a screen display of a completed round of play in which the player won. The round of play was initiated using the first of the two above-discussed methods. The player initially wagered 20 credits, and thereafter touched the "BUY" interactive button 44. Thereafter, the computing device 10 plotted the first point A, which had a vertical axis value of 20. During play, the segmented line 34 failed to "intersect" a "CASH" special event icon 91 and 93 or "SPLIT" special even icon 92. Nevertheless, the random value of the security increased across time. The round of play ended when the time allotted for a given round of play expired, at which point the security had a value of 31 credits. As a result, the player had a net gain of 31 minus 20, or 11 credits.

Revenue is generated for the casino, game operator, or other establishment by the game from losses by the player. However, revenue can also be generated for the casino, game operator, or other establishment by charging a "commission" in the form of a percentage of the value of the security at the time of purchase and/or sale. Likewise, the player can be charged a fee on the amount of time used during the round. The fee would also be subtracted from the value of the security at specific time intervals; this way the "commission" is gradually paid out over time. The "commission" could be an absolute value, a percentage of the initial bet, a percentage of the current payout value, or some combination thereof. The commission could be determined by a preset formula.

A player can also win or lose by selling "short." In that embodiment, the player would "sell" at a point in time (prior to buying) and then terminate the wager by "buying" to cover the short at a later time. The amount won, or outcome, is the initial "sell" value minus the ending "buy" value, less any house commission.

The foregoing description of one or more embodiments of the invention have been presented for purposes of illustration and description, and is not intended to be exhaustive or to limit the invention to the precise form disclosed. The description was selected to best explain the principles of the invention and practical application of these principles to enable other skilled in the art to best utilize the invention in various embodiments and various modifications as are suited to the particular use contemplated. It is intended that the scope of the invention not be limited by the specification, but be defined by the claims as set for the below.

The invention is claimed as follows:

1. A method of operating a gaming device including a game operable upon a wager by a player, said method comprising:

(a) displaying a graph including a first axis and a second axis, wherein a plurality of different potential payout values are associated with the first axis and an indication of time is associated with the second axis;

(b) indicating a randomly determined one of the payout values on the graph;

(c) enabling a player to accept the indicated payout value on the graph;

(d) if the player does not accept the indicated payout value and the indicated payout value is not a last indicated payout value, repeating (b) and (c) until the player accepts the indicated payout value or the indicated payout value is the last indicated payout value; and (e) providing an outcome to the player, wherein the outcome is based on the indicated payout value accepted by the player or the last indicated payout value indicated on the graph.

2. The method of claim 1, wherein each randomly determined one of the payout values is indicated on the graph for a designated time period.

3. The method of claim 2, which includes, for each indicated payout value on the graph, enabling the player to accept said indicated payout value during the designated time period for said indicated payout value.

4. The method of claim 2, wherein one of the randomly determined payout values indicated on the graph is the last indicated payout value after a designated overall time period expires.

5. The method of claim 1, wherein one of the randomly determined payout values indicated on the graph is the last indicated payout value after a designated overall time period expires.

6. The method of claim 1, wherein one of the randomly determined payout values indicated on the graph is the last indicated payout value after a designated number of randomly determined payout values are indicated on the graph.

7. The method of claim 1, which includes indicating the wager made by the player on the graph before indicating the first randomly determined one of the payout values on the graph.

8. The method of claim 1, wherein at least two of the indicated randomly determined payout values are the same.

9. The method of claim 1, wherein the outcome is: (a) the indicated payout value accepted by the player and reduced by a designated house commission; or (b) the last indicated payout value indicated on the graph and reduced by a designated house commission.

10. The method of claim 1, which includes initiating an event if one of the indicated payout values on the graph intersects an icon displayed on the graph.

11. The method of claim 10, wherein the event includes adding a value to the indicated payout value that intersects the icon.

12. The method of claim 10, wherein the event includes subtracting a value from the indicated payout value that intersects the icon.

13. The method of claim 10, wherein the event includes initiating at least one bonus game.

14. The method of claim 1, which is provided through a data network.

15. The method of claim 14, wherein the data network is the internet.

16. The method of claim 1, wherein the graph is displayed as part of the game operable upon a wager.

17. The method of claim 1, wherein the graph is displayed as part of a bonus game.

18. A method of operating a gaming device including a game operable upon a wager by a player and a bonus game operable upon a triggering event, said method comprises:

(a) for a play of the bonus game, displaying the graph including a first axis and a second axis, wherein a plurality of different potential payout values are associated with the first axis and an indication of time is associated with the second axis;

(b) for said play of the bonus game, sequentially indicating a plurality of randomly determined payout values on the graph each for a designated amount of time; and (c) for said play of the bonus game, providing to the player an outcome based on a last payout value indicated on the graph when no time remains in the play of the bonus game.

19. The method of claim 18, which includes indicating the wager made by the player on the graph before indicating the first randomly determined one of the payout values on the graph.

20. The method of claim 18, wherein at least two of the indicated randomly determined payout values are the same.

21. The method of claim 18, wherein the outcome is the last indicated payout value indicated on the graph and reduced by a designated house commission.

22. The method of claim 18, which includes initiating an event if one of the indicated payout values intersects an icon displayed on the graph.

23. The method of claim 22, wherein the event includes adding a value to the indicated payout value that intersects the icon.

24. The method of claim 22, wherein the event includes subtracting a value from the indicated payout value that intersects the icon.

25. The method of claim 18, which is provided through a data network.

26. The method of claim 25, wherein the data network is the internet.

* * * * *

UNITED STATES PATENT AND TRADEMARK OFFICE

CERTIFICATE OF CORRECTION

PATENT NO. : 7,338,360 B2
APPLICATION NO. : 11/381947
DATED : March 4, 2008
INVENTOR(S) : Eugene Jarvis et al.

It is certified that error appears in the above-identified patent and that said Letters Patent is hereby corrected as shown below:

In Column 1, Line 30, change “currencies and the live” to --currencies and the like--.

In Column 2, Line 7, change “keep plays interested” to --keep players interested--.

In Column 4, Line 36, change “period between and few seconds” to --periods between a few seconds--.

In Column 5, Line 28, change “special even icon” to --special event icon--.

In Column 5, Line 34, change “as a n “intersected icon”” to --as an “intersected icon”--.

In Column 5, Line 47, change “point A to pint B” to --point A to point B--.

In Column 6, Line 20, change “a debit car” to --a debit card--.

In Column 6, Line 58, change “the player to inset more” to --the player to insert more--.

In Column 6, Line 59, change “IF the player” to --If the player--.

In Column 7, Line 17, change “chart value is check to see” to --chart value is checked to see--.

In Column 8, Lines 45, change “to enable other skilled in the art” to --to enable others skilled in the art--.

Signed and Sealed this

First Day of September, 2009

David J. Kappos
*Director of the United States Patent and Trademark Office*